(12) United States Patent
Brazil et al.

(10) Patent No.: US 6,193,124 B1
(45) Date of Patent: Feb. 27, 2001

(54) CONTAINER TRANSPORT APPARATUS AND METHOD OF USE

(76) Inventors: Glenn J. Brazil, 5614 S. Thompson; Donald L. Wilson, 5606 S. Thompson, both of Tacoma, WA (US) 98408

(*) Notice: Subject to any disclaimer, the term of this patent is extended or adjusted under 35 U.S.C. 154(b) by 0 days.

(21) Appl. No.: 09/298,550

(22) Filed: Apr. 22, 1999

(51) Int. Cl.$^7$ ........................................... B60R 9/00
(52) U.S. Cl. .................. 224/521; 224/525; 224/529; 224/530; 224/534; 414/462; 414/470
(58) Field of Search ................... 224/280, 281, 224/518, 519, 520, 521, 522, 524, 525, 529, 530, 534, 537; 414/462, 470

(56) References Cited

U.S. PATENT DOCUMENTS

| | | | |
|---|---|---|---|
| 4,234,284 | * 11/1980 | Hauff | 224/521 X |
| 4,561,575 | * 12/1985 | Jones | 224/521 X |
| 5,029,740 | * 7/1991 | Cox | 224/521 X |
| 5,536,130 | * 7/1996 | Edensor | 414/462 |
| 5,788,135 | * 8/1998 | Janek | 224/527 |
| 5,857,824 | * 1/1999 | De Aquiar | 414/462 |

* cited by examiner

Primary Examiner—Stephen K. Cronin
(74) Attorney, Agent, or Firm—N. Paul Friederichs

(57) ABSTRACT

A carrier engagable with a hitch receiver, including a hitch receiver; an elongate frame; a tank receiving seat connected to the frame; a coupler shaft extending horizontally from the frame; and a receiver insert assembly comprising a receiver insert arranged for insertion into a hitch receiver and a support arm that extends substantially horizontally from the receiver insert for rotatably receiving the coupler shaft such that the frame is rotatable from a first upright position for receiving the tank to a second substantially horizontal position for supporting and transporting the tank.

16 Claims, 6 Drawing Sheets

CONTAINER TRANSPORT APPARATUS AND METHOD OF USE

FIELD OF THE INVENTION

This invention relates generally to portable waste holding tanks commonly employed in recreational vehicles, and more particularly to a method and apparatus for transporting such waste holding tanks: the apparatus being engagable with truck mounted hitch receivers for support and transportation of the same. This application claims priority from provisional patent application Ser. No. 60/082,708.

BACKGROUND OF THE INVENTION

Recreational vehicles are fast becoming a common means of entertainment and travel to remote destinations for people of all ages. In part, the reason for their popularity is due to the fact that recreational vehicles offer a self-contained environment with all the amenities of a home, that can be easily driven from one location to another. Accordingly, one feature found on most such vehicles is a means for collecting and storing waste water. For this purpose, removable holding tanks are commonly included on the recreational vehicle (RV) for waste water collection. One problem that arises with this arrangement, however, is transporting the holding tank to a collection center without having to disconnect utilities from the RV and move the same to the collection center. Because of this, there is a need for a transport apparatus that will facilitate the transportation of holding tanks from parked RVs to waste collection sites.

SUMMARY OF THE INVENTION

As a result of this need, the invention provided is a waste-tank transport engagable with a standard truck mounted hitch receiver for transporting a portable waste holding tank to a waste collection site. Typically, hitch receivers mounted to trucks are oriented along a substantially horizontal receiver axis, and are designed to engage with any appropriately sized and shaped rectangular member. Broadly stated, the waste-tank transport comprises an elongate frame having opposing ends. On one end thereof, a tank receiving seat is mounted for supporting and positioning a portable waste holding tank in relation to the frame. Extending horizontally from the frame is a coupler shaft that, as will be explained below, is employed to transfer the weight of a waste holding tank to the hitch receiver.

Further, a receiver insert assembly engagable with the hitch receiver is provided. The receiver insert assembly comprises a receiver insert arranged for insertion into a hitch receiver for support therefrom, and a support arm that extends substantially horizontally from the receiver insert for rotatably receiving the coupler shaft. With this arrangement, the frame is rotatable from a first upright position for receiving a waste holding tank, to a second substantially horizontal position for supporting and transporting the waste holding tank to a waste collection site.

In another aspect of the invention, the support arm further comprises a vertically oriented leg disposed to selectively engage the receiver insert for placement of the support arm to a plurality of predetermined vertical positions. In this way, variations in height of the hitch receiver above the ground can be compensated for before the waste holding tank is received on to the waste-tank transport.

DETAILED DESCRIPTION OF PREFERRED EMBODIMENT

Figure 1:
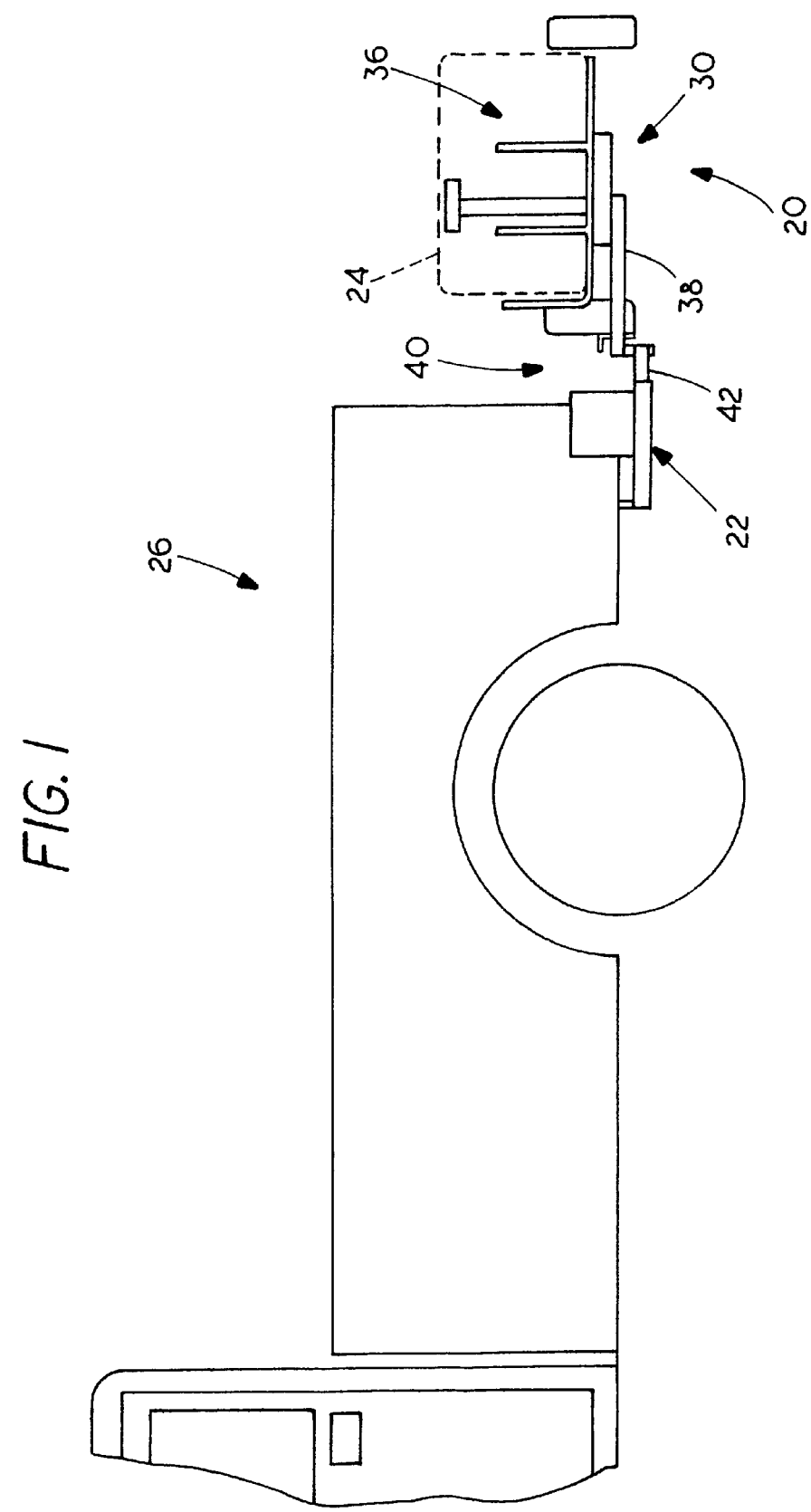
FIG. 1 is a side elevational view of a waste-tank transport engaged with a truck mounted hitch receiver, the waste-tank transport being in the second horizontal position for transportation of the waste holding tank.
Figure 2:
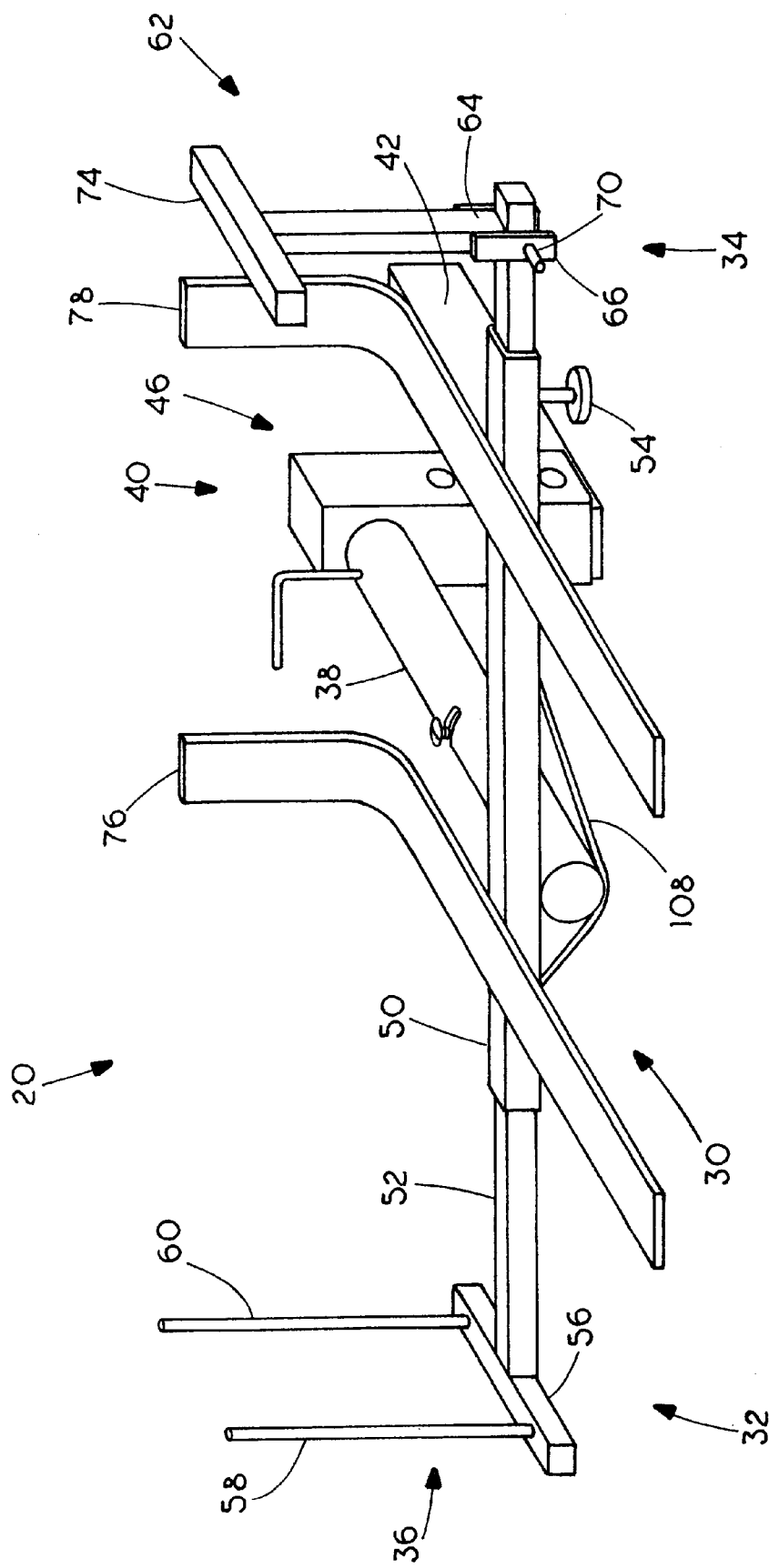
FIG. 2 is side perspective view of a waste-tank transport.
Figure 3:
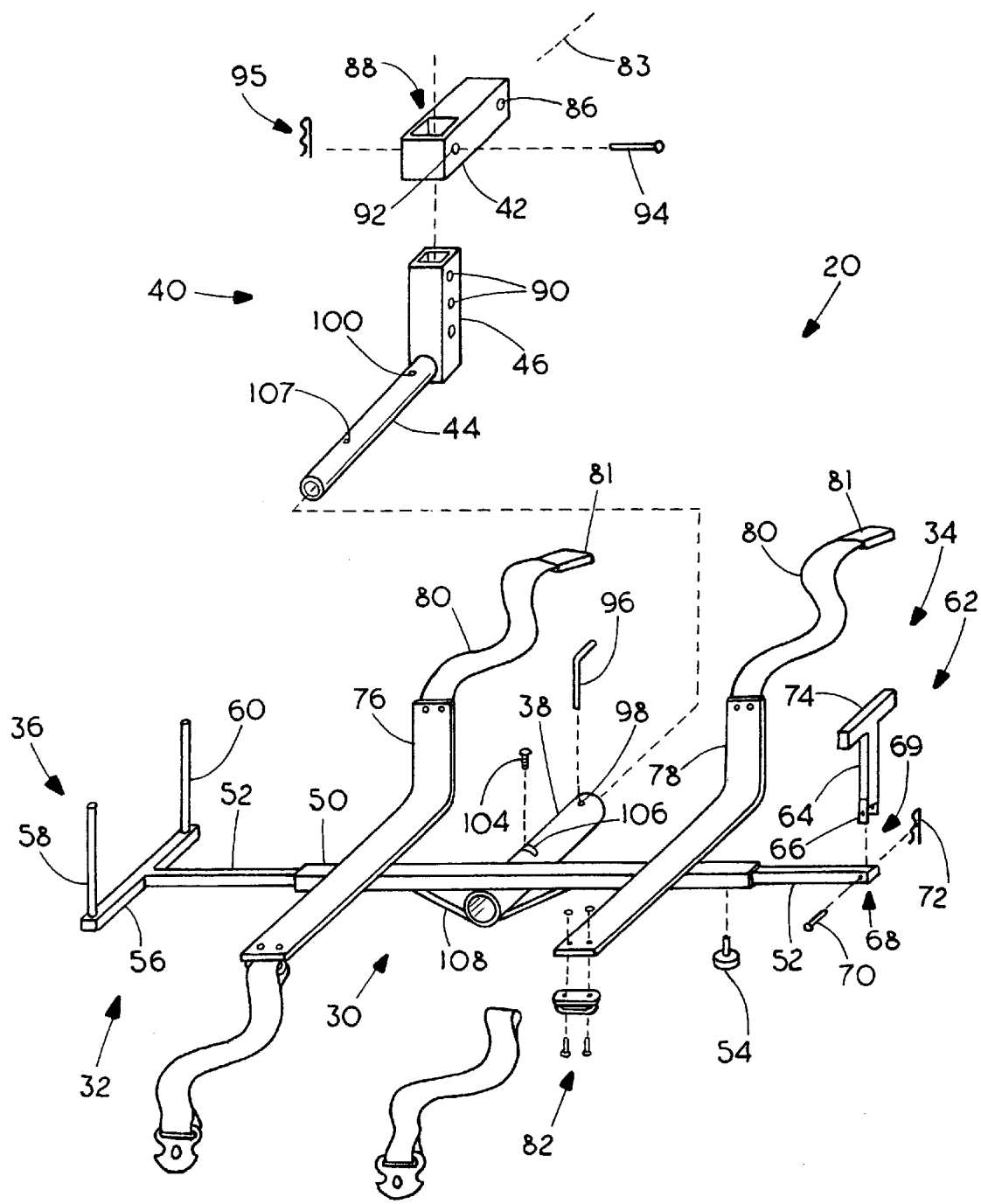
FIG. 3 is an exploded perspective view of a waste-tank transport.
Figure 4:
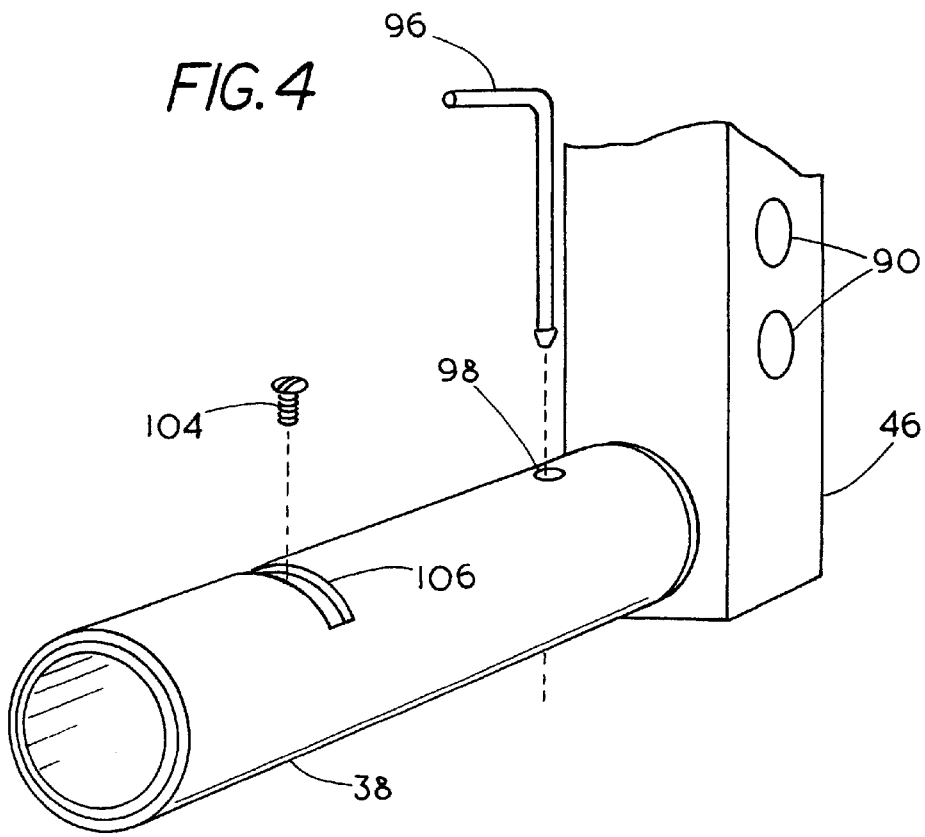
FIG. 4 is a fragmentary perspective view of a receiver insert assembly illustrating a coupler shaft received over a support arm, with the support arm rigidly fixed to a vertically oriented leg.

Referring now to the drawings, and first to FIGS. 1 through 3, shown generally at 20 is a waste-tank transport. In the preferred embodiment, the waste-tank transport is engagable with a standard truck mounted hitch receiver 22 for transporting a portable waste holding tank 24 to a waste collection site (not illustrated). Typically, hitch receivers mounted to trucks are oriented along a substantially horizontal receiver axis 28, and are designed to engage and support any appropriately sized and shaped rectangular member. Broadly stated the waste-tank transport 20 comprises an elongate frame 30 having opposing lower and upper ends 32–34. On the lower end 32 thereof, a tank receiving seat 36 is mounted for supporting and positioning a portable waste holding tank 24 in relation to the frame 30. Extending horizontally from the frame 30 is a coupler shaft 38 that, as will be explained below, is employed to transfer the weight of a waste holding tank 24, through a receiver insert assembly 40, to the hitch receiver 22.

Figure 6A:
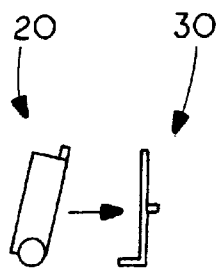
FIGS. 6A through 6D are a series of illustrations showing (6A) a waste-tank transport receiving a waste holding tank; (6B) rotation of the waste-tank transport to a horizontal position, (6C) the waste-transport in the horizontal locked position, and (6D) unloading the contents of a waste holding tank through a waste hook-up from a partially tilted waste-tank transport.
Figure 6B:
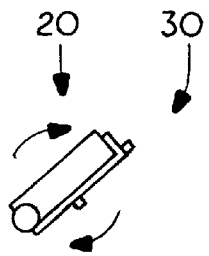
Figure 6C:
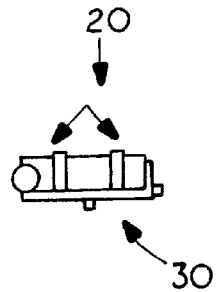
Figure 6D:
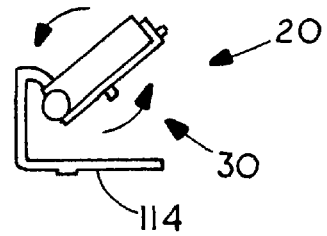

Accordingly, a receiver insert assembly 40 engagable with the hitch receiver 22 is provided. The receiver insert assembly 40 comprises a receiver insert 42 arranged for insertion into a hitch receiver for support therefrom, and a support arm 44 that extends substantially horizontally from the receiver insert 42 for rotatably receiving the coupler shaft 38. With this arrangement, the frame 30 is rotatable from a first upright position, as illustrated in FIG. 6A, for receiving a waste holding tank, to a second substantially horizontal position for supporting and transporting the waste holding tank 24 to a waste collection site, as illustrated in FIG. 6C.

In another aspect of the invention, the support arm 44 further comprises a vertically oriented leg 46 disposed to selectively engage the receiver insert 42 for placement of the support arm 44 to a plurality of predetermined vertical positions. In this way, the waste-tank transport 20 can be easily adapted to a wide variety of trucks and RVs with a one time set-up/adjustment. Specifically, variations in height of the hitch receiver 32 above the ground, can be compensated for by adjusting the leg 46 to a particular vehicle to properly position frame 30 relative to the hitch receiver 22.

Considering now in more detail the structure of the components from which a waste-tank transport 20 is constructed, the frame 30 includes a guide support 50 to which the coupler shaft 38 is connected and extends horizontally therefrom. As best illustrated in FIG. 3, the guide support 50 acts as a stationary component that receives an adjustable sliding member 52. In this way, the sliding member 52 can be adjusted to a plurality of positions relative to the guide support 50. Accordingly, the user of a waste-tank transport 20 can make fine adjustments to compensate for an uneven ground surface.

In the preferred embodiment, the guide support 50 is a square tubular member that receives the sliding member 52 therein; the guide support 50 being shorter in length than the sliding member 52. Likewise, the sliding member 52 is square so that a close fit within the guide support 50 is achieved. In order to lock the sliding member 52, in relation to the guide support 50, a locking screw 54 is threadedly received through the wall of the guide support 50. With this arrangement, the locking screw 54 can be urged against the sliding member 52, locking the same in a desired position.

Figure 5:
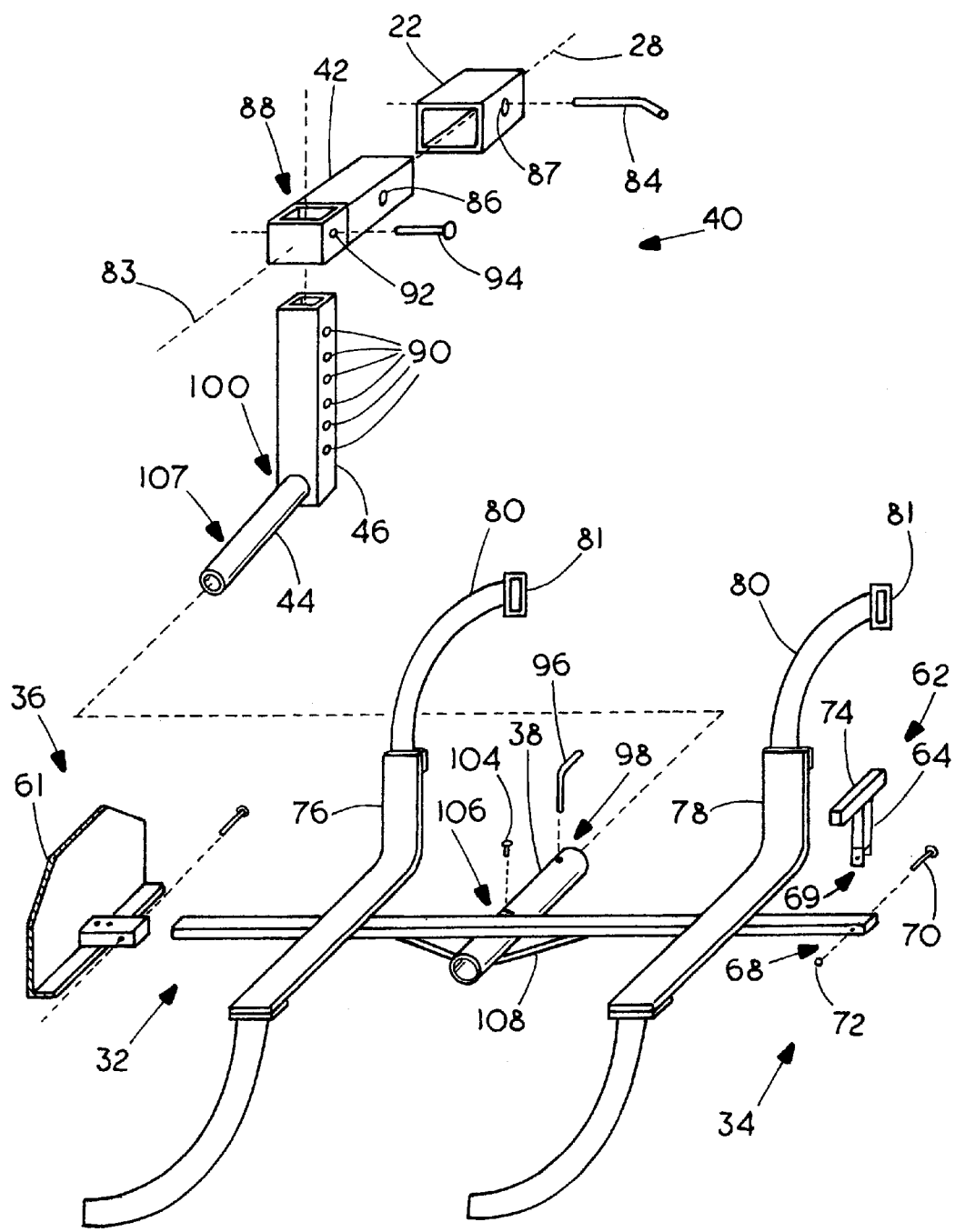
FIG. 5 is an exploded perspective view of an alternate embodiment waste-tank transport.
Figure 7:
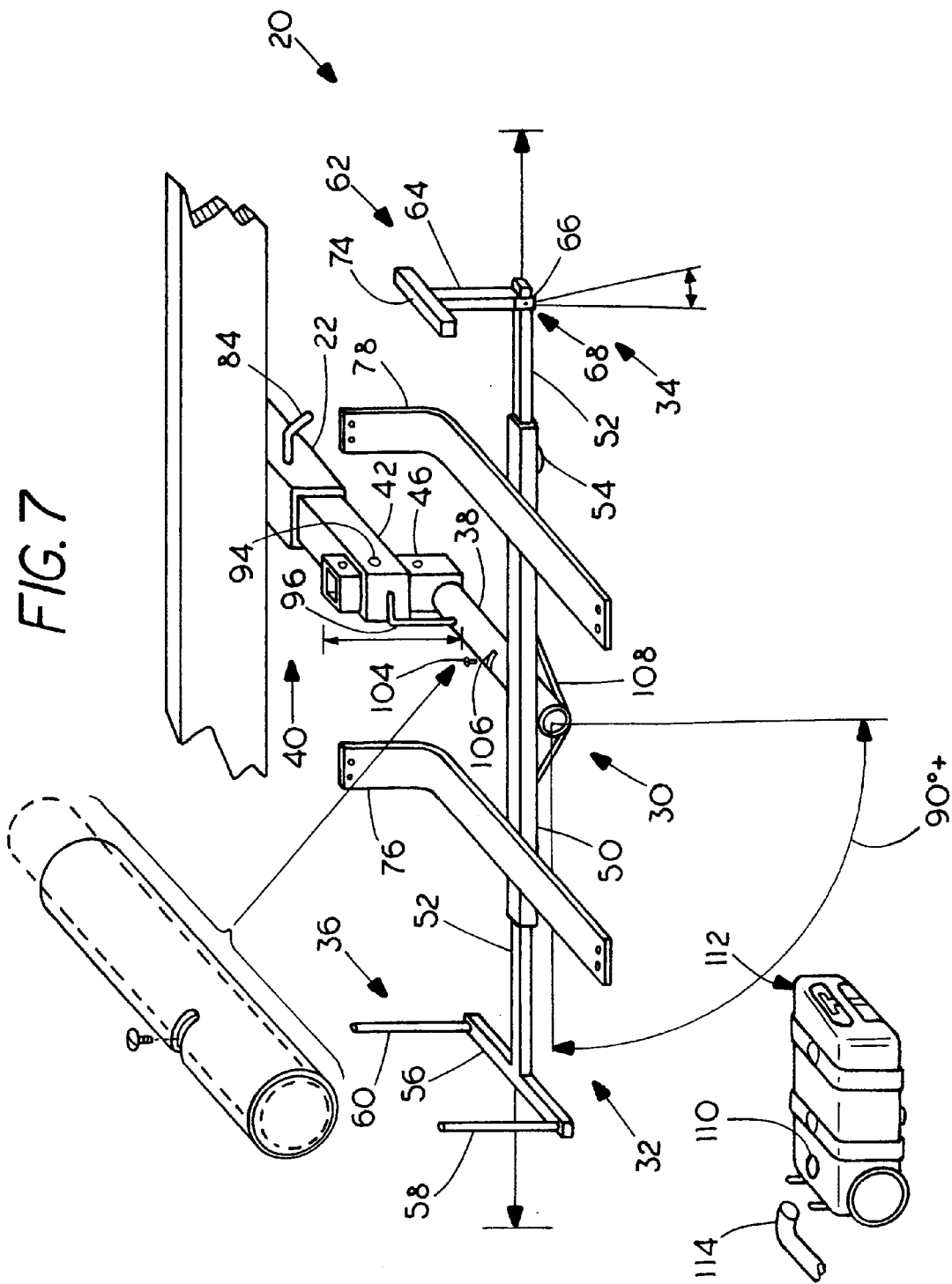
FIG. 7 is an perspective view illustration showing the rotational path of a waste-tank transport.

In the preferred embodiment, a portion of the sliding member 52 represents the lower end 32 of frame 30. As can be seen, at the lower end 32, a seat 36 is attached to the sliding member 52. The seat 36 includes a cross member 56, which may be welded to the sliding member 52, and may have a plurality, preferably two, prongs 58–60. Importantly, the prongs 58–60 support the waste holding tank 24 as the frame 30 is rotated from the first upright position to the second horizontal position. It should be understood that the construction of a seat 36 as noted above could easily be modified in a number of ways with little effect on its performance. For example, FIG. 5 illustrates an alternate embodiment seat 36 that is constructed of a bent plate 61.

At the upper end 34 of frame 30, a handle 62 is rotatably mounted to the sliding member 52 as illustrated in FIG. 3. For this connection, the handle 62 comprises a tubular arm 64 having a portion of one end removed to form opposing ears 66 that are disposed to either side of the sliding member 52. As illustrated, the ears 66 are connected to the sliding member 52 via a headed pin 70 that is guided through coaxially disposed holes 68–69. A clip 72 is attached to pin 70 to prevent it from working its way out of the holes 68–69. Additionally, a cross tie 74 is mounted/welded to the opposing end of arm 64. As will be seen in the following, the cross tie 74 provides a convenient member for the user to manipulate the waste holding tank 24.

Directing attention to FIGS. 1 and 3, a waste holding tank 24 is maintained in proper position on the waste-tank transport 20 by a pair of similarly constructed retaining arms 76 and 78. The retaining arms 76–78 may be constructed from metal and welded to the guide support 50 as illustrated. The retaining arms 76–78 are preferably bent to form a 90 degree angle so that a strap 80 can be pulled taught thereby drawing the waste holding tank 24 toward the retaining arms. Each strap 80 is conventional in construction: each includes a buckle 81 and is fastened to its respective retaining arm by common fasteners 82.

To provide a connection between the frame 30 and the hitch receiver 22, a receiver insert assembly 40 is provided. The receiver insert assembly 40 comprises a receiver insert 42 disposed along a receiver insert axis 83. The receiver insert 43 is coaxially received into the hitch receiver 22, along the receiver axis 28, and locked into position by a receiver pin 84 that is guided through receiver locking holes 86 and 87.

In the preferred embodiment, the receiver insert 42 is constructed to define a vertically oriented opening 88 through which leg 46 is received. Importantly, a plurality of vertically spaced adjusting bores 90 are provided horizontally through leg 46. In the preferred embodiment, the leg 46 is constructed of rectangular tubular steel of a size to closely fit within a similarly shaped and formed opening 88. Likewise, a locking bore 92 is provided horizontally through the receiver insert 42, at the receiver locking hole 86, such that a headed locking pin 94 can be guided therethrough and held with fastener 95 once the user aligns an adjusting bore 90 with the locking bore 92. In this way, the leg 46 is vertically adjustable thereby allowing the user to adjust "one-time" the height of the frame 30 in relation to a level ground surface.

It should be noted that one way forming the opening 88 is to weld a small section of rectangular tubular steel, oriented with its axis vertical, to a similar section of tubular steel oriented with its axis horizontal. In this way, the leg 46 could be received into the small section of vertically oriented tubular steel.

Extending horizontally from the leg 46, and welded thereto, is the support arm 44. In the present invention, the support arm 44 is a solid steel rod having a diameter sized to allow the same to be received within the coupling shaft 38. Accordingly, the coupling shaft 38 is constructed from a cylindrically shaped steel tube that accommodates a close fit over the support arm 44. As a result, the coupling shaft 38 can rotate about the support arm 44 thereby facilitating the user to rotate the frame 30 from the first upright position to the second horizontal position.

However, once the frame 30 is rotated to the second horizontal position, the user must be able to maintain the frame 30 in a substantially horizontal position while transporting the waste holding tank 24. For this purpose, an arm locking pin 96 is disposed vertically through locking holes 98 and 100. It should be noted that locking holes 98–100 are in alignment only when the frame 30 is in the second horizontal position. Additionally, in order to quickly rotate the frame 30 to the precise horizontal position, a stop lug 104 is secured to the support arm 44. The stop lug 104 is disposed through a slot 106 that is formed through the coupler shaft 38. In the preferred embodiment, the stop lug 104 is a threaded screw that is threadedly received through a threaded hole 107 in the support arm 44.

Because the weight of a fully loaded waste holding tank 24 can be substantial, the connection between the coupler shaft 38 and the frame 30 is reinforced in the preferred embodiment. The reinforcement provided is a brace 108 which extends outward from the coupler shaft 38 to the guide support 50 as illustrated in FIGS. 2 and 3; the brace 108 is welded to the coupler shaft 38 and to the guide support 50.

Additionally, it should be noted that in the preferred embodiment, the second substantially horizontal position of frame 30 is actually slightly past horizontal. To put it differently, as the frame 30 is rotated from the first upright position, for receiving a waste holding tank 24, it is rotated slightly more than 90 degrees to the second substantially horizontal position. The attachment of the coupler shaft 38 to the frame 30 is arranged to provide this result. In this way, the contents within the waste holding tank 24 tends to collect away from the outflow hole 110 of the waste holding tank 24.

Turning now to FIGS. 6A through 6D, the use of a waste-tank transport 20 is straight forward and simple. Briefly, to transport a waste holding tank 24, the user rolls the same onto the waste tank transport 20 such that the seat is under the waste holding tank 24. Simultaneously, the user guides the cross tie 74 of handle 62 through the tank handle opening 112. Then with a slightly uplifting force, the handle 62 is directed/ manipulated upward securing the waste holding tank against the frame 30. After each strap 80 is secured around the waste holding tank 24, the frame 30 is then rotated to the second substantially horizontal position and locked into position by arm locking pin 96.

Importantly, it should be understood that the axis of rotation of the frame 30 is defined by the support arm 44, and is substantially parallel to the receiver axis 28. In this way, the user can easily rotate the frame 30 into the second horizontal position.

Once the waste-tank transport 20 is secured in the horizontal position, it can be transported to a collection facility where a collection hose 114 is connected to the outflow hole 110 of the waste holding tank 24. Then by simply rotating the frame to the horizontal position, the waste water is drained from the waste holding tank 24. Accordingly, unloading and returning the waste holding tank 24 to the RV is substantially the reverse of the above noted procedure.

Finally, it should be noted that in the present invention, the majority of components are fabricated from steel tubing, and are joined by welds. However, a waste-tank transport 20 could easily be modified by using other materials in the construction thereof, and other methods of joining the components without departing from the spirit and intent of the present invention.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A carrier engagable with a hitch receiver, comprising:
   a hitch receiver;
   an elongate frame;
   a tank receiving seat connected to the frame;
   a coupler shaft extending horizontally from the frame; and
   a receiver insert assembly comprising a receiver insert arranged for insertion into a hitch receiver and a support arm that extends substantially horizontally from the receiver insert for rotatably receiving the coupler shaft such that the frame is rotatable from a first upright position for receiving a tank to a second substantially horizontal position for supporting and transporting a tank and the support arm further comprising a vertically oriented leg disposed to selectively engage the receiver insert.

2. A carrier as recited in claim 1 further comprising:
   at least one retaining arm fixed to the frame for receiving and retaining the tank thereto.

3. A carrier as recited in claim 1 further comprising:
   a handle mounted to an end of the frame.

4. A carrier as recited in claim 1 wherein the frame further comprises:
   a sleeve; and
   an adjustable column slidably received by the sleeve.

5. A carrier as recited in claim 4 wherein the sleeve is tubular in shape and the column is coaxially disposed within the sleeve for slidable engagement with the sleeve.

6. A carrier comprising:
   means for receiving a hitch;
   an elongate frame comprising a sleeve; and
   an adjustable column slidably received by the sleeve;
   a tank receiving seat connected to the frame;
   a coupler shaft extending horizontally from the frame; and
   a receiver insert assembly comprising a receiver insert arranged for insertion into a hitch receiver and a support arm that extends substantially horizontally from the receiver insert for rotatably receiving the coupler shaft such that the frame is rotatable from a first upright position for receiving a tank to a second substantially horizontal position for supporting and transporting a tank.

7. The device of claim 6 wherein the means for receiving is connected to a truck.

8. The device of claim 6 wherein the frame is lockable in at least two positions.

9. The device of claim 6 wherein the holding means comprises:
   a tank.

10. The device of claim 9 wherein the tank holds waste water.

11. The device of claim 9 wherein the tank is selectively secured to the frame.

12. A method of storing comprising the steps of:
    placing a substance in a container;
    joining a frame to a vehicle;
    connecting the container to the frame while the frame is in a first position,
    the frame being vertical in the first position;
    rotating the frame to a second position, the frame being horizontal in the second position; and
    locking the frame in the second position.

13. The method of claim 12 wherein the substance is waste water.

14. The method of claim 12 wherein the vehicle is a truck.

15. The method of claim 12 wherein the step of locking is a step of selectively locking the frame.

16. The method of claim 12 further comprising the step of removing the container from the frame.

* * * * *